(12) United States Patent  (10) Patent No.: US 9,146,418 B2
Kim et al.  (45) Date of Patent: Sep. 29, 2015

(54) DISPLAY DEVICE

(75) Inventors: Gun-Shik Kim, Yongin (KR); Jun-Sik Oh, Yongin (KR); Dong-Kyu Lee, Yongin (KR)

(73) Assignee: Samsung Display Co., Ltd. (KR)

( * ) Notice: Subject to any disclaimer, the term of this patent is extended or adjusted under 35 U.S.C. 154(b) by 907 days.

(21) Appl. No.: 13/366,645

(22) Filed: Feb. 6, 2012

(65) Prior Publication Data

US 2012/0320287 A1  Dec. 20, 2012

(30) Foreign Application Priority Data

Jun. 16, 2011  (KR) .................. 10-2011-0058636

(51) Int. Cl.
*H05B 33/00* (2006.01)
*G02F 1/13* (2006.01)
*G02F 1/1335* (2006.01)

(52) U.S. Cl.
CPC ............ *G02F 1/133603* (2013.01); *G02F 2001/133565* (2013.01); *G02F 2201/44* (2013.01)

(58) Field of Classification Search
None
See application file for complete search history.

(56) References Cited

U.S. PATENT DOCUMENTS

| 6,556,260 | B1 * | 4/2003 | Itou et al. ..................... 349/69 |
| 2009/0236976 | A1 * | 9/2009 | Lee ............................ 313/504 |
| 2010/0007632 | A1 * | 1/2010 | Yamazaki ................... 345/175 |
| 2010/0052528 | A1 | 3/2010 | Park et al. |
| 2010/0141872 | A1 * | 6/2010 | Paek et al. .................... 349/69 |
| 2010/0171905 | A1 * | 7/2010 | Huang et al. ................. 349/69 |
| 2012/0206675 | A1 * | 8/2012 | Seo et al. .................... 349/96 |

FOREIGN PATENT DOCUMENTS

| KR | 1020020027936 | 4/2002 |
| KR | 1020040042249 | 5/2004 |
| KR | 1020040080146 | 9/2004 |
| KR | 1020060097934 | 9/2006 |
| KR | 1020100024709 | 3/2010 |
| KR | 1020100100358 | 9/2010 |

\* cited by examiner

*Primary Examiner* — Ashok Patel
(74) *Attorney, Agent, or Firm* — Knobbe Martens Olson & Bear LLP

(57) ABSTRACT

A display device including: an organic light emitting display unit formed on a first substrate, the organic light emitting display unit comprising first and second electrodes facing each other, and an organic emissive layer formed between the first and second electrodes; and a liquid crystal display unit formed on a second substrate facing the first substrate, the liquid crystal display unit configured to operate as a liquid crystal shutter in response to an electrical potential difference, wherein a resonance structure of the organic light emitting display unit enables the liquid crystal display unit to form an image in a color reflected from each pixel of the organic light emitting display unit.

16 Claims, 3 Drawing Sheets 301G 301R 301B

DISPLAY DEVICE

CROSS-REFERENCE TO RELATED APPLICATIONS

This application claims the benefit of Korean Patent Application No. 10-2011-0058636, filed on Jun. 16, 2011, in the Korean Intellectual Property Office, the disclosure of which is incorporated herein in its entirety by reference.

BACKGROUND

1. Field

The present disclosure relates to a display device, and more particularly, to a display device in which an organic light-emitting display unit and a reflective liquid crystal display unit are coupled to each other so as to maximize outdoor visibility.

2. Description of the Related Technology

In general, an organic light-emitting display device including a thin film transistor (TFT) is drawing attention since it can be applied to electric and electronic products, such as a digital camera, a video camera, a camcorder, a personal digital assistant (PDA), a smart phone, a thin film television set, an ultra-slim notebook, a tablet PC, a flexible display device, and the like.

The organic light-emitting display device is a self luminescent display device that forms a color by recombining and emitting holes and electrons that are injected into an anode and a cathode at an organic emissive layer (EML), and has a stack structure in which the EML is interposed between the anode and the cathode.

However, since such a stack structure may not obtain highly efficient emissive, the organic light-emitting display device selectively uses an intermediate layer such as a hole injection layer (HIL), a hole transport layer (HTL), an electron transport layer (ETL), and an electron injection layer (EIL) that are disposed between electrodes and the EML.

A liquid crystal display panel is a light receiving display device that does not emit light, but rather receives light incident from outside to display an image.

The liquid crystal display panel displays an image, a number, a character, and the like by injecting liquid crystals between a plurality of substrates, and changing an arrangement of liquid crystal molecules when power is supplied. The liquid crystal display panel may be classified in various ways according to a driving method, a display method, and a display form. In this regard, a thin film transistor (TFT) liquid crystal display panel is a panel in which transistors are uniformly arranged on a substrate.

In particular, a liquid crystal display panel of a semi-transmission structure has excellent visibility characteristics under sunlight. However, power consumption increases, reflectivity is reduced, and the manufacturing process is difficult due to a reduction in an aperture ratio.

The organic light-emitting display device has advantageously a high color recombination rate, high contrast, and wide viewing angles, compared to the liquid crystal display panel. However, the organic light-emitting display device has an outdoor visibility characteristic caused by a polarizing film, and thus visibility of the organic light-emitting display device deteriorates due to a reflected polarizing film. Therefore, the organic light-emitting display device needs a structure capable of securing visibility under sunlight.

SUMMARY OF CERTAIN INVENTIVE ASPECTS

One or more embodiments provide display devices including a structure of a reflective liquid crystal display unit so as to maximize outdoor visibility of an organic light emitting display unit.

According to one aspect, there is provided a display device including: an organic light emitting display unit formed on a first substrate, the organic light emitting display unit comprising first and second electrodes facing each other, and an organic emissive layer formed between the first and second electrodes; and a liquid crystal display unit formed on a second substrate facing the first substrate, the liquid crystal display unit configured to operate as a liquid crystal shutter in response to an electrical potential difference, wherein a resonance structure of the organic light emitting display unit enables the liquid crystal display unit to form an image in a color reflected from each pixel of the organic light emitting display unit.

The pixels of the organic light emitting display unit and the pixels of the liquid crystal display unit may face each other and be equal in quantity.

The liquid crystal display unit may be a reflective type liquid crystal display unit, where one of the first and second electrodes formed on the first substrate is a reflective plate.

The organic light emitting display unit may include a thin film transistor and an organic light emitting diode, and has the resonance structure including a combination of a reflective electrode and a semi-transparent electrode, where the first electrode is an anode electrically connected to the thin film transistor, and the second electrode is a cathode facing the first electrode.

The first electrode may be the reflective electrode formed of a reflective metal.

The second electrode may be the semi-transparent electrode formed of a semi-transparent metal.

The organic emissive layer may include red, green, and blue emissive layers to emit red, green, and blue lights, respectively, where the red, green, and blue emissive layers form green, violet, and yellow colors, respectively, due to the resonance structure.

A spacer may be disposed between the first and second substrates to maintain a gap therebetween.

The display device may further include: a touch pattern layer formed on the exterior surface of the second substrate.

The liquid crystal display unit may be a color filterless type.

The liquid crystal display unit may maintain an off status at night or indoors, and an on status outdoors or at solar light.

The organic light emitting display unit and the liquid crystal display unit may have the same resolution.

A polarizing plate may be formed in the exterior surface of the second electrode, where the organic light emitting display unit and the liquid crystal display unit share the polarizing plate.

The organic light emitting display unit may include a thin film transistor and an organic light emitting diode.

The thin film transistor may include a semiconductor active layer formed on the first substrate and comprising source and drain regions and a channel region; a gate electrode stacked on the semiconductor active layer via an insulating layer; and source and drain electrodes respectively electrically connected to the source and drain regions via a contact hole.

The organic light emitting diode may include: the first electrode electrically connected to the source electrode or the drain electrode; the organic emissive layer formed on the first electrode; and the second electrode formed on the organic emissive layer.

BRIEF DESCRIPTION OF THE DRAWINGS

The above and other features and advantages will become more apparent by describing in detail certain embodiments with reference to the attached drawings in which.

DETAILED DESCRIPTION OF CERTAIN INVENTIVE EMBODIMENTS

Figure 1:
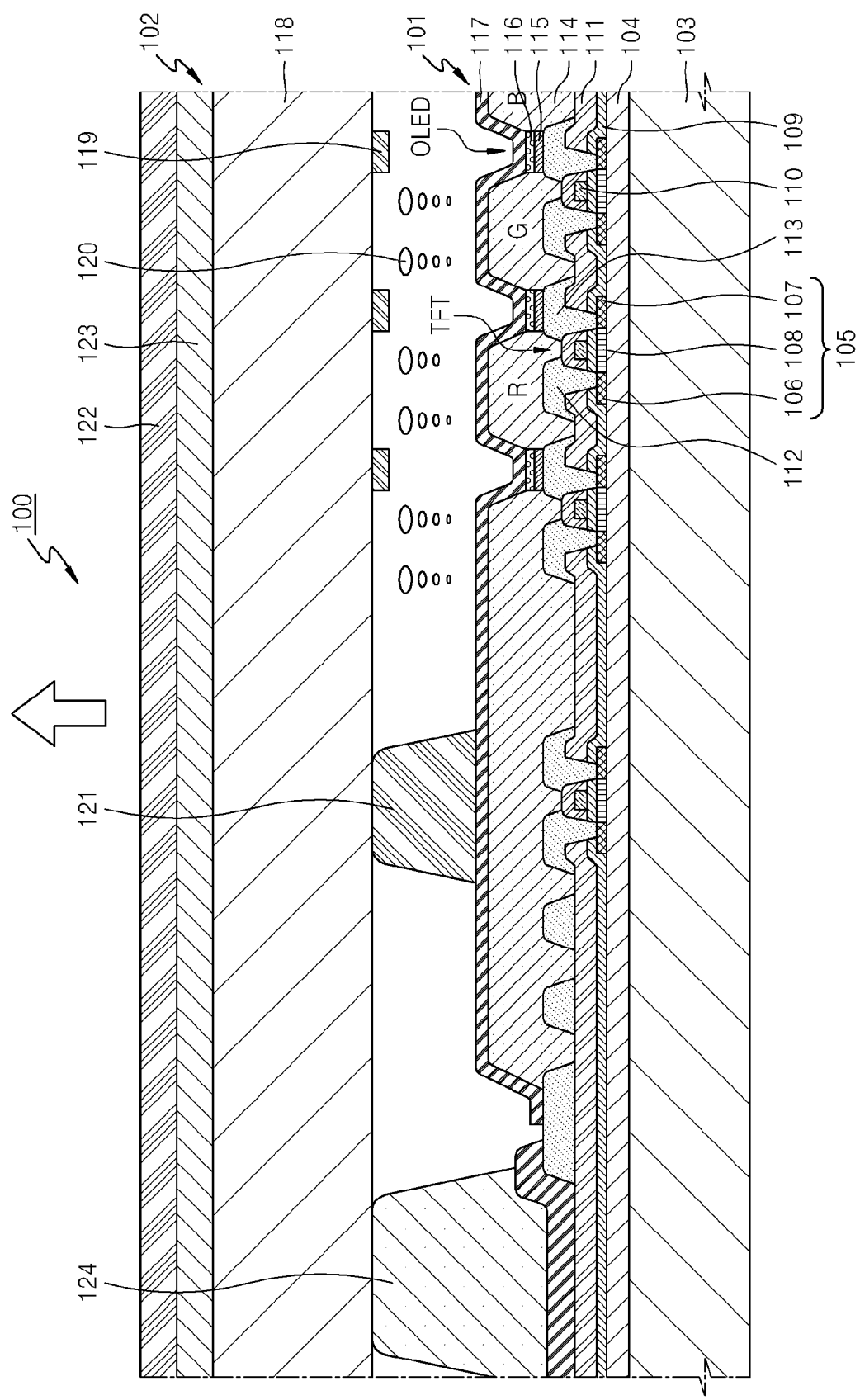
FIG. 1 is a cross-sectional view illustrating an embodiment of a display device.

As the invention allows for various changes and numerous embodiments, certain embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While terms such as "first," "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present disclosure, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the display module will be described below in more detail with reference to the accompanying drawings. Those components that are the same or are in correspondence are generally referred to with the same reference numeral regardless of the figure number, and redundant explanations are omitted.

FIG. 1 is a cross-sectional view illustrating an embodiment of a display device 100.

Referring to FIG. 1, the display device 100 includes an organic light emitting display unit 101 and a liquid crystal display unit 102 stacked on the organic light emitting display unit 101.

The display device 100 includes a first substrate 103. The first substrate 103 may be an insulation substrate formed of, for example, glass, plastic, or the like.

A buffer layer 104 is formed on the first substrate 103. The buffer layer 104 may include an organic material, an inorganic material, or a combination of an organic material and an inorganic material alternately stacked on each other. The buffer layer 104 prevents moisture or impurities generated from the first substrate 103 from diffusing. The buffer layer 104 also adjusts a transfer speed of heat when a semiconductor active layer 105 is crystallized, thereby facilitating crystallization of a semiconductor.

The semiconductor active layer 105 of a predetermined pattern is formed on the buffer layer 104. In embodiments where the semiconductor active layer 105 is formed of polysilicon, the polysilicon may be formed by forming amorphous silicon and crystallizing the amorphous silicon.

A variety of methods of crystallizing the amorphous silicon may be used, including a rapid thermal annealing (RTA) method, a solid phase crystallization (SPC) method, an excimer laser annealing (ELA) method, a metal induced crystallization (MIC) method, a metal induced lateral crystallization (MILC) method, a sequential lateral solidification (SLS) method, and the like.

A source region 106 and a drain region 107 are formed in the semiconductor active layer 105 by doping N-type or P-type impurity ions. A channel region 108 that is not doped with impurities is formed between the source region 106 and the drain region 107.

A gate insulating layer 109 is deposited on a top portion of the semiconductor active layer 105. The gate insulating layer 109 may be a single layer formed of $SiO_2$, or a double layer formed of $SiO_2$ and $SiN_x$.

A gate electrode 110 is formed on a predetermined region of a top portion of the gate insulating layer 109. The gate electrode 110 is connected to a gate line (not shown) that applies a thin film transistor on/off signal. The gate electrode 110 can use a single or multiple metals, and may be a single layer such as Mo, MoW, Cr, Al, Al alloy, Mg, Al, Ni, W, Au, and the like or a multi layer of a mixture of these single layers.

An interlayer insulating layer 111 is formed on a top portion of the gate electrode 110. A source electrode 112 is electrically connected to the source region 106 via a contact hole. A drain electrode 113 is electrically connected to the drain region 107 via a contact hole.

A protection layer 114 (a passivation layer and/or a planarization layer) formed of SiO2 and SiNx, or the like, is formed on top portions of the source electrode 112 and the drain electrode 113. The protection layer 114 may be formed of an organic material such as benzocyclobutene (BCB) or acryl, or an inorganic material such as SiNx. The protection layer 114 may be a single layer, or a double or multi layer, and may have various modifications.

A first electrode 115 that operates as an anode is formed by partially etching the protection layer 114. The first electrode 115 is electrically connected to one of the source electrode 112 and the drain electrode 113.

The first electrode 115 operates as one of electrodes included in an organic light emitting device, and may be formed of various conductive materials. The first electrode 115 may be a transparent electrode or a reflective electrode.

In some embodiments, where the first electrode 115 is the transparent electrode, the first electrode 115 may be formed of ITO, IZO, ZnO, or $In_2O_3$. In embodiments where the first electrode 115 is the reflective electrode, the first electrode 115 may be formed by forming a reflective layer using silver (Ag), magnesium (Mg), aluminum (Al), platinum (Pt), lead (Pd), gold (Au), nickel (Ni), neodymium (Nd), iridium (Ir), chromium (Cr), or any compound thereof, and doping the reflective layer with ITO, IZO, ZnO, or $In_2O_3$.

The first electrode 115 may have a shape corresponding to an opening shape of each sub-pixel when the first electrode 115 is the transparent electrode or the reflective electrode.

An organic emissive layer 116 is formed in an exposed portion of the first electrode 115. The organic emissive layer 116 may be formed of a low molecular or high molecular organic material.

In embodiments where the organic emissive layer 116 is formed of a low molecular weight organic material, a hole injection layer (HIL), a hole transport layer (HTL), an emissive layer (EML), an electron transport layer (ETL), an electron injection layer (EIL), and the like, may be stacked in a single or complex structure to form the organic emissive layer 116.

In embodiments where the organic emissive layer 116 is formed of a low molecular weight organic material, the low molecular weight organic material includes copper phthalocyanine (CuPc), N,N'-Di(naphthalene-1-yl)-N,N'-diphenylbenzidine (NPB), or tris-8-hydroxyquinoline aluminum (Alq3). In such embodiments, the EML 116 may be formed in various ways. The organic emissive layer 116 may be formed by resonance depositing these high molecular weight organic materials.

In embodiments where the organic emissive layer 116 is formed of the high molecular weight organic material, the organic emissive layer 116 may include the HTL and an emissive layer (EML). The HTL may be formed of PEDOT, and the EML may be formed of polyphenylene vinylene (PPV) or polyfluorene high molecular organic materials, and may be formed using a screen printing method or an inkjet printing method.

A second electrode 117 that operates as a cathode and faces the first electrode 115 is formed on a top portion of the organic emissive layer 116.

The second electrode 117 may also be a transparent electrode or a reflective electrode.

In some embodiments, when the second electrode 117 is the transparent electrode, the second electrode 117 may include a layer formed of a material habing a low work function, such as Li, Ca, LiF/Ca, LiF/Al, Al, Ag, and Mg, and compounds thereof, and an auxiliary electrode or a bus electrode line formed of a transparent electrode material such as ITO, IZO, ZnO, or $In_2O_3$ formed on the layer.

In embodiments where the second electrode 117 is the reflective electrode, the second electrode 117 may be formed by depositing Li, Ca, LiF/Ca, LiF/Al, Al, Ag, Mg, or compounds thereof onto the front surface of the second electrode 117.

The second electrode 117 may be formed by depositing the transparent electrode or the reflective electrode onto the front surface of a display region. In other embodiments, the second electrode 117 may be formed in various patterns. The first electrode 115 and the second electrode 117 may be stacked in opposite directions.

As described above, an organic light emitting device emits red, green, and blue lights from red, green, and blue pixels according to a flow of current, and forms predetermined image information. The organic light emitting device includes the first electrode 115 that is connected to the source electrode 112 or the drain electrode 113 of a thin film transistor (TFT), the second electrode 117 that covers the entire region of a pixel, and the organic emissive layer 116 disposed between the first electrode 115 and the second electrode 117. The first electrode 115 receives a positive power supply from the source electrode 112 or the drain electrode 113. The second electrode 117 receives negative power supply.

The first electrode 115 and the second electrode 117 are insulated from each other via the organic emissive layer 116. The first 115 and second 117 electrodes apply voltages of different polarities to the organic emissive layer 116, and allow the organic emissive layer 116 to emit light. The first electrode 115 and the second electrode 117 may have opposite polarities.

Sub-pixels of the organic light emitting display unit 101 include at least one TFT or organic light emitting diode. However, the present invention is not limited to the structure of the TFT shown in FIG. 1, and the number and structure of the TFT may be modified in various ways.

The display device 100 includes a second substrate 118 that faces the first substrate 103. The second substrate 118 is a transparent substrate, such as for example, a transparent glass substrate formed of, for example, soda lime glass. In other embodiments, the second substrate 118 may be a transparent plastic substrate.

A liquid crystal display TFT 119 is formed on the second substrate 118. The structure of the TFT 119 may include a structure of a semiconductor active layer, a source electrode, a drain electrode, a gate electrode, a pixel electrode, an insulating layer, and an arrangement layer, which is widely known to one of ordinary skill in the art, and thus its description will not be provided here.

A liquid crystal layer 120 is formed between the first substrate 103 and the second substrate 118. In some embodiments, the liquid crystal layer 120 may include liquid crystals having a negative type dielectric constant anisotropy, and may be perpendicularly arranged.

A spacer 121 is disposed between the first substrate 103 and the second substrate 118 to maintain a gap therebetween. Liquid crystals of the liquid crystal layer 120 are injected into a space partitioned by the spacer 121 by using a resonance injection method.

The second electrode 117 of the organic light emitting display unit 101 may be used as a common electrode of the liquid crystal display unit 102 that faces the TFT 119.

Accordingly, a pixel electrode included in the TFT 119 receives a pixel signal and generates an electric potential difference between the pixel electrode and the second electrode 117 used as the common electrode when the liquid crystal display unit 102 operates. The electric potential difference allows the liquid crystals of the liquid crystal layer 120 injected between the first substrate 103 and the second substrate 118 to function as a liquid crystal shutter, and thus the liquid crystals rotate due to the negative type dielectric constant anisotropy, thereby forming an image.

In some embodiments, an additional common electrode may be formed instead of the second electrode 117 being used as the common electrode.

A polarizing plate 122 is formed on an exterior surface of the second substrate 118. The polarizing plate 122 is commonly applied to the organic light emitting display unit 101 and the liquid crystal display unit 102, and prevents external light from being reflected.

In addition, a touch pattern layer 123 may be further formed between the second substrate 118 and the polarizing plate 122 so as to implement a touch panel function.

A sealing member 124 is formed in a boundary where the first substrate 103 and the second substrate 118 are coupled to each other to prevent impurities or moisture from invading from the outside.

The organic light emitting display unit 101 and the liquid crystal display unit 102 must have the same resolution in such a way that the display device 100 mainly uses the organic light emitting display unit 101 at night or indoors in which external light has a weak intensity, and mainly uses the liquid crystal display unit 102 in the daytime or outdoors in which external light has a strong intensity.

Pixels patterned to the organic light emitting display unit 101 may correspond to pixels patterned to the liquid crystal display unit 102.

The number or locations of pixels patterned to the organic light emitting display unit 101 must be identical to the number or locations pixels patterned to the liquid crystal display unit 102 in a perpendicular direction, in order to implement a full color of the display device 100.

Furthermore, one of the first electrode 115 and the second electrode 117 of the organic light emitting display unit 101 must be used as a reflective plate in order to use the liquid crystal display unit 102 as a reflective display unit.

In some embodiments, the first electrode 115 is used as the reflective plate. Thus, if external light is incident into the display device 100, the incident light can be exited from the first electrode 115 through the second substrate 118. As described above, the liquid crystal display unit 102 is the reflective display unit, and thus no backlight unit is unnecessary.

In addition, the liquid crystal display unit 102 is a color filterless type display device that implements a color without a color filter layer. Because the reflective color characteristics of red, green, and blue pixels of the organic light emitting display unit 101 are used, the liquid crystal display unit 102 does not need the color filter layer. The organic light emitting display unit 101 has a resonance structure, and thus reflective light forms a specific color.

Figure 2:
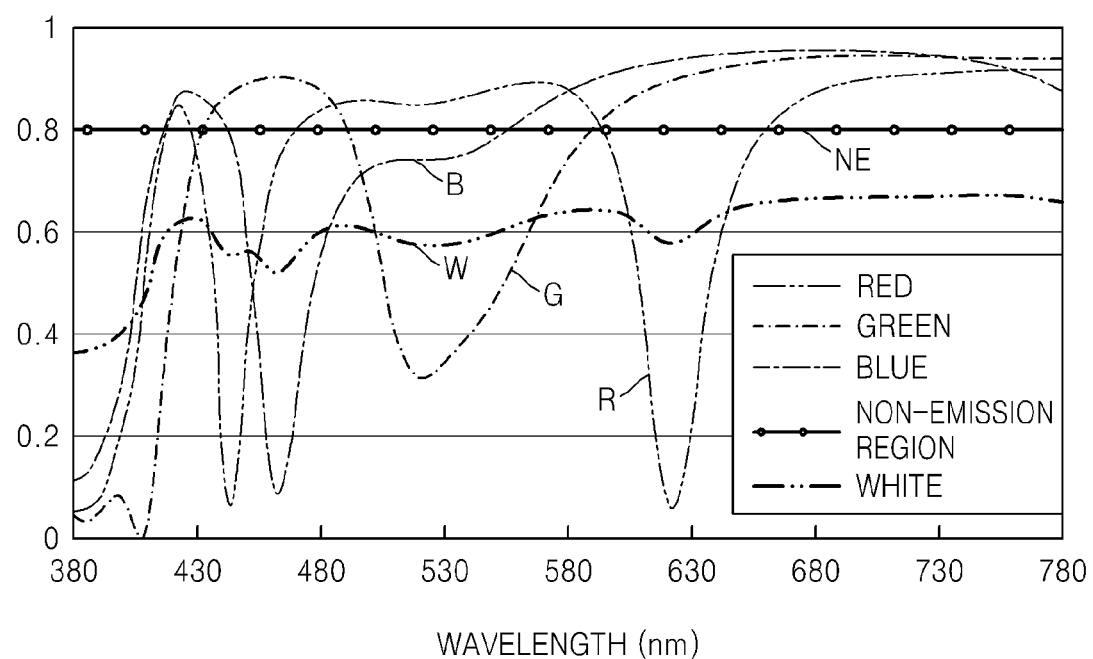
FIG. 2 is a graph showing a reflection spectrum of an embodiment of a liquid crystal display unit.

FIG. 2 is a graph showing a reflection spectrum of an embodiment of a liquid crystal display unit.

In FIG. 2, the X axis indicates the wavelength band, and the Y axis indicates reflectivity.

Referring to FIG. 2, a curve R of a red pixel has a reflectivity higher than 80% (or 0.8) and a maximum absorptivity around a wavelength band of 620 nanometers, a curve G of a green pixel has a reflectivity higher than 80% (or 0.8) and a maximum absorptivity around a wavelength band of 520 nanometers, and a curve B of a blue pixel has a reflectivity higher than 80% (or 0.8) and a maximum absorptivity around a wavelength band of 440 nanometers.

A curve W indicates a reflection spectrum in a white pixel, and a curve NE indicates a reflection spectrum in a non-emissive unit.

Figure 3A:
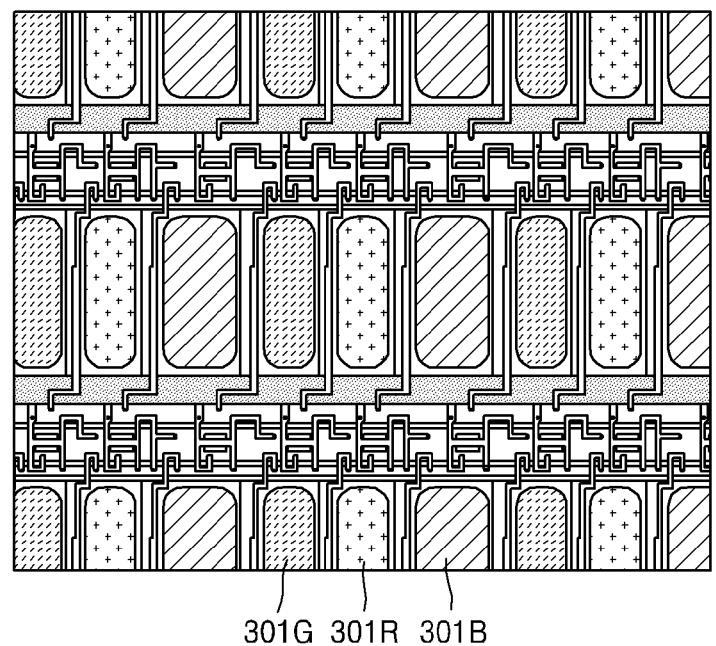
FIGS. 3A and 3B illustrate pixels of an embodiment of an organic light emitting display unit.
Figure 3B:
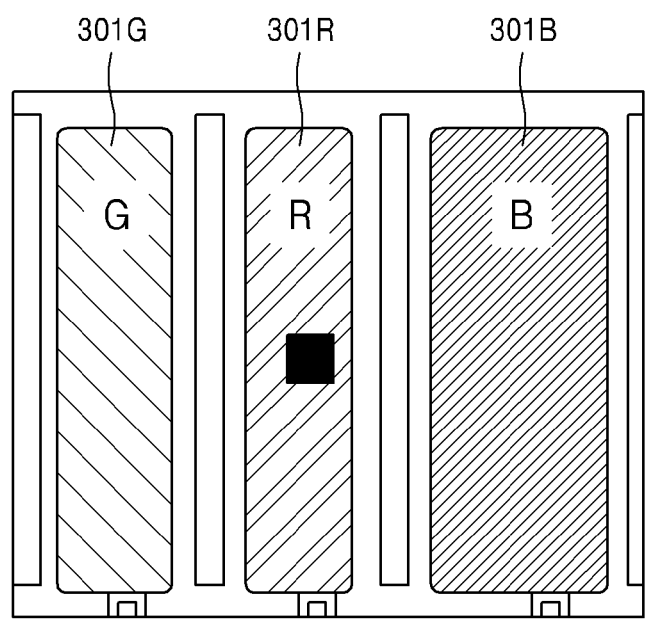

FIGS. 3A and 3B illustrate pixels of an embodiment of the organic light emitting display unit 101.

Referring to FIGS. 3A and 3B, when seen with the naked eye, the organic light emitting display unit 101 forms green reflective light in a red pixel 301R, violet reflective light in a green pixel 301G, and yellow reflective light in a blue pixel 301B.

Such green, violet, and yellow reflective lights are due to the resonance structure of the red, green, and blue pixels of the organic light emitting display unit 101. The red, green, and blue pixels have different thin film thicknesses.

The first electrode 115 and the second electrode 117 are configured as a combination of a reflective electrode and a semi-transparent electrode so as to implement a micro-cavity effect.

In top emissive type display embodiments implementing an image in a direction of the second substrate 118, the first electrode 115 may be a reflective electrode formed of, such as, for example, a reflective metal such as Ag, Mg, Al, Pt, Pd, Au, Ni, Nd, Ir, Cr, and compounds thereof, or may further include a ITO, IZO, ZnO, or $In_2O_3$ layer on a top portion and/or a bottom portion of the reflective metal.

The second electrode 117 may be a semi-transparent metal, such as, for example, an Mg and Ag alloy or metal such as Ag, Al, Au, Pt, Cr, etc. or an alloy containing these metals. The second electrode 117 may have a thickness in such a way that a reflectivity higher than about 5% and transmittance of about 50% can be implemented.

Accordingly, although the organic light emitting display unit 101 does not operate, the first electrode 115 and the second electrode 117 have a resonance structure of a combination of the reflective electrode and the semi-transparent electrode, and have different thin film thicknesses of red, green, and blue pixels. When white light is incident, light of a green wavelength band is absorbed, light of red and blue wavelength bands is reflected and forms a violet color in the green pixel, a green color in the red pixel, and a yellow color in the blue pixel.

The operation of the display device 100 having the above structure will now be described.

When the display device 100 is used at night or indoors in which external light has a weak intensity, the liquid crystal display unit 102 maintains an off status, the organic light emitting display unit 101 operates, and thus voltages are applied to the first electrode 115 and the second electrode 117, and the organic emissive layer 116 emits light, thereby forming an image. The polarizing plate 122 prevents external light from being reflected.

When the display device 100 is used at solar light or outdoors in which external light has a strong intensity, the liquid crystal display unit 102 operates, voltages are applied to the second electrode 117 and the liquid crystal display TFT 119, such application gives rise to a status change in proportional to a voltage applied to liquid crystals of the liquid crystal layer 120 disposed between the first substrate 103 and the second substrate 118, a uniform amount of light of light source incident from the outside transmits the liquid crystal layer 120, the amount of light is modulated and reflected from the first electrode 115, thereby forming an image.

Accordingly, although the organic light emitting display unit 101 remains in the off status, since the red, green, and blue pixels of the organic light emitting display unit 101 have a resonance structure, a desired color can be implemented by using the reflection light generated from the organic light emitting display unit 101 without a color filter.

In some embodiments, the organic light emitting display unit 101 and the liquid crystal display unit 102 may simultaneously operate at solar light or outdoors in which external light has a strong intensity.

For example, to form a yellow color, the yellow color is formed by emitting the red and blue pixels of the liquid crystal display unit 102 and mixing the emitted red and blue pixels. Simultaneously, the blue pixel of the organic light emitting display unit 110 does not emit light, and a color is reflected due to a resonance phenomenon and forms the yellow color. In this regard, a color image can be corrected by using color change algorithm.

Although the red, green, and blue pixels are described, the present invention is not limited thereto. In other embodiments, the red, green, and blue pixels can form one of red, green, and blue colors irrespective of a sequence thereof.

In addition, as long as a full color is implemented, a combination of different colors, other than a combination of the red, green, and blue colors, can be possible. As long as the full color is implemented, various modifications such as a combination of four pixels can also be possible.

As described above, embodiments of the display device can obtain the following effects.

Outdoor visibility of a reflective liquid crystal display unit can be obtained without a change in the characteristics such as the image quality of an organic light emitting display unit or power consumption thereof.

A polarizing film is used to prevent external light from being reflected in the organic light emitting display unit and serve as an operating polarizing film in a reflective liquid crystal display unit.

A color is formed by using the reflection color characteristic of pixels of the organic light emitting display unit without a color filter.

An aperture ratio of the reflective liquid crystal display unit is not reduced, thereby easily obtaining a reflection brightness.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. A display device comprising:
   an organic light emitting display unit formed on a first substrate, the organic light emitting display unit comprising first and second electrodes facing each other, and an organic emissive layer formed between the first and second electrodes; and
   a liquid crystal display unit comprising:
      a common electrode, wherein the common electrode is the second electrode of the organic light emitting display unit,
      a liquid crystal display (LCD) thin film transistor (TFT) formed on a second substrate facing the first substrate, the LCD TFT comprising a pixel electrode, and
      a liquid crystal layer including liquid crystals, the liquid crystal layer formed between the first and second substrates,
      wherein an electrical potential difference between the pixel electrode and the second electrode rotates the liquid crystals,
   wherein a resonance structure of the organic light emitting display unit enables the liquid crystal display unit to form an image in a color reflected from each pixel of the organic light emitting display unit.

2. The display device of claim 1, wherein pixels of the organic light emitting display unit and pixels of the liquid crystal display unit face each other and are equal in quantity.

3. The display device of claim 1, wherein the liquid crystal display unit is a reflective type liquid crystal display unit, and wherein one of the first and second electrodes formed on the first substrate is a reflective plate.

4. The display device of claim 1, wherein the organic light emitting display unit comprises a thin film transistor and an organic light emitting diode, and has the resonance structure including a combination of a reflective electrode and a semi-transparent electrode, and wherein the first electrode is an anode electrically connected to the thin film transistor, and the second electrode is a cathode facing the first electrode.

5. The display device of claim 4, wherein the first electrode is the reflective electrode formed of a reflective metal.

6. The display device of claim 4, wherein the second electrode is the semi-transparent electrode formed of a semi-transparent metal.

7. The display device of claim 4, wherein the organic emissive layer comprises red, green, and blue emissive layers to emit red, green, and blue lights, respectively, and wherein the red, green, and blue emissive layers form green, violet, and yellow colors, respectively, due to the resonance structure.

8. The display device of claim 1, wherein a spacer is disposed between the first and second substrates to maintain a gap therebetween.

9. The display device of claim 1, further comprising: a touch pattern layer formed on the exterior surface of the second substrate.

10. The display device of claim 1, wherein the liquid crystal display unit is a color filterless type.

11. The display device of claim 1, wherein the liquid crystal display unit maintains an off status at night or indoors, and an on status outdoors or at solar light.

12. The display device of claim 1, wherein the organic light emitting display unit and the liquid crystal display unit have the same resolution.

13. The display device of claim 1, wherein a polarizing plate is formed in the exterior surface of the second electrode, and wherein the organic light emitting display unit and the liquid crystal display unit share the polarizing plate.

14. The display device of claim 1, wherein the organic light emitting display unit comprises a thin film transistor and an organic light emitting diode.

15. The display device of claim 14, wherein the thin film transistor comprises:
   a semiconductor active layer formed on the first substrate and comprising source and drain regions and a channel region;
   a gate electrode stacked on the semiconductor active layer via an insulating layer; and
   source and drain electrodes respectively electrically connected to the source and drain regions via a contact hole.

16. The display device of claim 15, wherein the organic light emitting diode comprises:
   the first electrode electrically connected to the source electrode or the drain electrode;
   the organic emissive layer formed on the first electrode; and
   the second electrode formed on the organic emissive layer.

* * * * *